Dec. 15, 1959 W. GLUCK 2,917,723

TUBE SOCKET FOR PRINTED CIRCUITS

Filed May 28, 1956 2 Sheets-Sheet 1

INVENTOR.
WILLIAM GLUCK

BY James and Franklin

ATTORNEYS

Dec. 15, 1959

W. GLUCK 2,917,723

TUBE SOCKET FOR PRINTED CIRCUITS

Filed May 28, 1956

2 Sheets-Sheet 2

INVENTOR.
WILLIAM GLUCK

BY James and Franklin

ATTORNEYS

United States Patent Office 2,917,723
Patented Dec. 15, 1959

2,917,723

TUBE SOCKET FOR PRINTED CIRCUITS

William Gluck, Bronx, N.Y., assignor to Industrial Hardware Manufacturing Co., Inc., New York, N.Y., a corporation of New York Application May 28, 1956, Serial No. 587,745
22 Claims. (Cl. 339—194)

This invention relates to detachable connectors, especially tube sockets, and more particularly sockets intended for use with printed circuits.

Printed circuits have grown in popularity, and sockets especially intended for use with such circuits have already been proposed. In these sockets the lower ends of the tails or soldering lugs are modified for reception in a ring of holes in the insulation panel on which the circuit is printed. The assembly may be completed by a so-called "pot soldering" operation. The primary object of the present invention is to generally improve sockets intended for use in this way.

More specific objects are to provide a socket in which the tails are replaced by hollow posts in order to act also as stiff support posts; to point the lower ends of the posts to facilitate insertion of the socket in the panel; to provide means to limit the insertion of the posts through the panel; and preferably to provide means whereby the posts are received in the panel with a snap fit which effectively holds them mechanically even before the soldering operation. Another object of the invention is to provide a terminal post with a maximum width of solder path for efficient electrical connection between the printed circuit and the post. Still another object is to make such a socket of the laminated or wafer type. Further objects are to devise a socket which will not be deformed even though shipped in mass containers such as a keg or drum; which will not become tangled with one another; and which is adapted for automatic socket insertion.

Considered in another aspect, further objects are to improve the handling, storage and shipment of sockets, and to avoid the need for hoppering of sockets when using mechanized insertion of the same. These objects are fulfilled generally by providing a connected series of sockets which may be handled as a unit or "stick" of sockets. Still another object is to provide such a stick of sockets in which the sockets are disposed in superposed or stacked relation, and in which they are held together, preferably by a snap engagement, although a resilient frictional or slip engagement might be employed. In accordance with a further feature and object of the invention, the parts of the sockets are so related as to provide a relatively rigid stick of sockets.

Still another object is to provide such a socket which is compact in radial dimension, even when designed to receive a vacuum tube of large size, typically the so-called "octal tube" having a keyed center post and eight pins on a diameter of about 1$\frac{1}{16}$". A still further object is to provide such a socket for larger tubes which will be adapted for mechanized insertion of tube sockets in accordance with the disclosure in my copending application Serial No. 579,664, filed April 20, 1956, and entitled "Mechanized Insertion of Radio Tube Sockets."

Some of the foregoing objects are fulfilled by providing a terminal post which is disposed end to end to the pin grip portion, and ancillary objects are to insure that each is yieldable independently of the other; to insure stiffness of the grip and post assembly; and to mount the tube contacts between insulation wafers which are generally circular but provided with a flat to help properly orient the same.

To accomplish the foregoing objects, and other more specific objects which will hereinafter appear, my invention resides in the tube socket elements, and their relation one to another, as are hereinafter more particularly described in the following specification. The specification is accompanied by drawings, in which.

Figures 1, 2, 3, 4, 5, 6, 7:
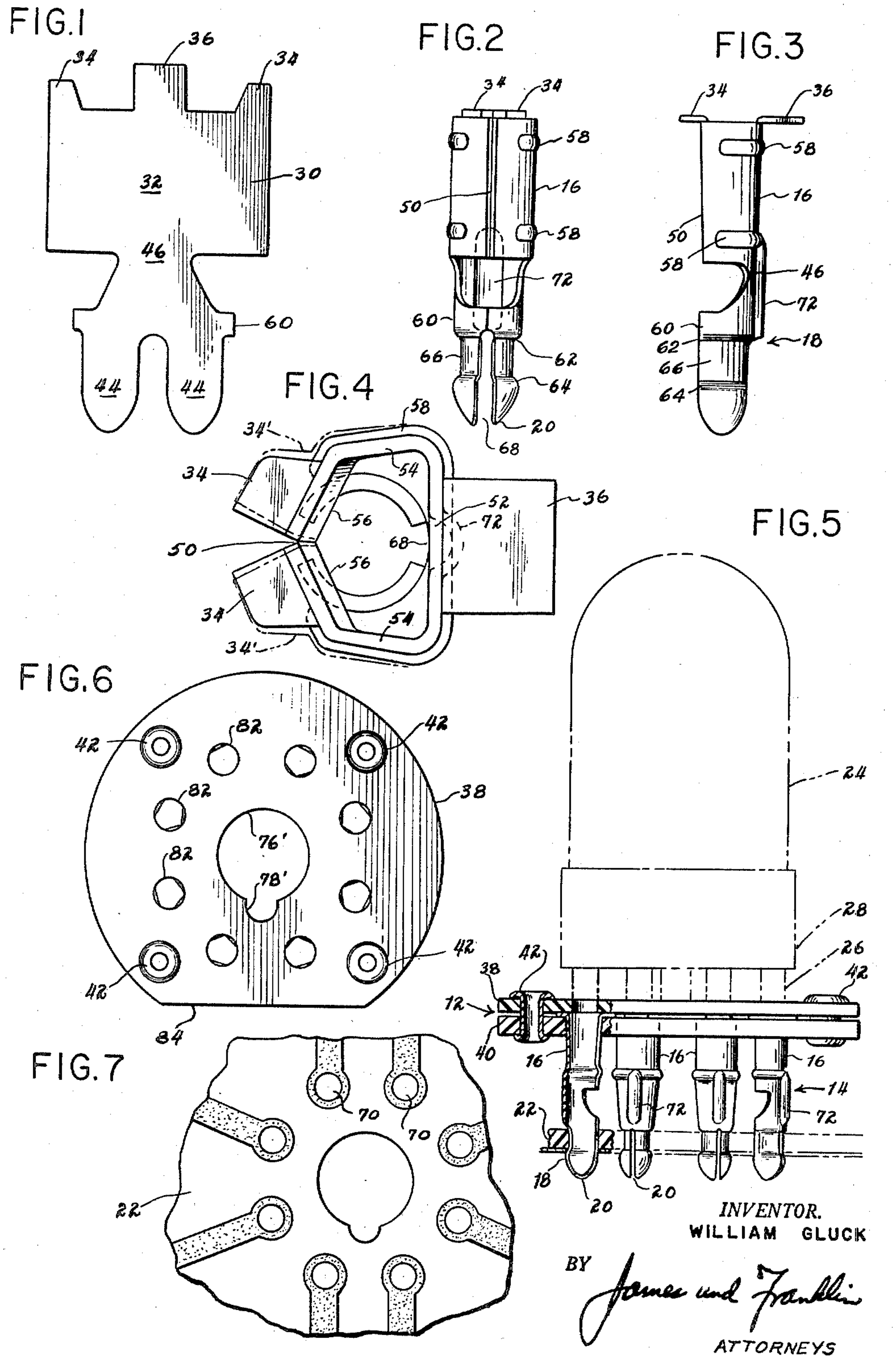
Fig. 1 shows a metal blank or "development" of one of the metal contacts.
Fig. 2 is an elevation of a contact formed from the blank shown in Fig. 1.
Fig. 3 is a side elevation of the same.
Fig. 4 is a plan view of the contact, drawn to enlarged scale.
Fig. 5 is a partially sectioned elevation of a finished socket showing how it is used.
Fig. 6 is a plan view of the socket.
Fig. 7 is a bottom view of a fragment of a printed circuit board with which the socket is used.

Referring to the drawing, and more particularly to Fig. 5, the socket comprises an insulation body generally designated 12, carrying a ring of metal contacts 14. Each of the contacts is made of a single piece of metal, and comprises a pin grip 16 at its upper end, and a support-and-terminal 18 at its lower end. The pin grip 16 and the terminal 18 are disposed end to end. The bottom ends or tips 20 of the terminals are so shaped as to be received with a resilient fit in a printed circuit board 22. The vacuum tube 24 here suggested is a so-called "octal" tube having pins 26 which are received in the pin grips 16. It will be understood that in Fig. 5 the tube has been only partially inserted, and that when fully inserted the base 28 of the tube may reach the insulation 12 of the socket.

Considering the arrangement in greater detail, the contacts 16 are all alike, and in the present case each is made out of a sheet metal blank 30 shaped as shown in Fig. 1. The main portion 32 is folded on vertical fold lines to form a split sleeve which acts as a pin grip. The tabs 34 and 36 at the top are bent outward and act to anchor the contacts in the insulation body of the socket, which, in the present case, is made up of an upper wafer 38 (Fig. 5) and a lower wafer 40 secured together by four small eyelets 42. Such a socket is commonly known as a "laminated" socket, in contradistinction to a "molded" socket, the wafers being stamped out of sheet insulation.

Reverting to Fig. 1, the lower part of the blank has parts 44 which subsequently form a split post which acts as a terminal and also as a support for the socket. Between the pin grip portion 32 and the post portion 44 the blank is necked, as shown at 46, to help insure independent resilient action of the upper and lower parts of the contact.

Referring now to Figs. 2, 3 and 4, the anchor lugs 34 and 36 are bent at right angles to the axis of the contact. The pin grip part 16 has a slit or separation at 50, and the resulting sleeve is preferably tapered somewhat in downward direction, as is best shown in Fig. 4. The slit 50 affords opening or spreading of the sleeve when the tube pin is inserted, and this action is suggested by the broken line parts 34'. The cross-section of the pin grip may vary, but in the present case is essentially a five-sided figure made up of a back 52, sides 54, and separate half walls 56 making up the front of the contact. To stiffen the resilient action of the pin grip it may be provided with circumferential beads 58, which also help insure full insertion of the tube pins into the socket.

The post 18 is generally tubular at its upper portion 60. The lower end 20 is given a rounded or pointed or bullet shape to facilitate pushing the same through a mating hole. The post is stepped inward at 62 and 64 to provide a portion 66 of reduced diameter, and the post is longitudinally slotted at 68 at diametrically opposite points so as to be readily compressible. By reference to Figs. 5 and 7 it will be evident that the contact may be received with a snap fit in a mating hole 70 in the insulating board 22.

As is known, a circuit is printed on board 22, (Fig. 7), and the printing may surround and may even be carried into the holes 70. The socket is mounted on the board simply by pushing it into position in proper orientation, following which the connections may all be soldered by a dipping or so-called "pot soldering" operation. Some difference in board thickness is accommodated by the slope at 62 and 64 (Fig. 2).

The middle of the contact is largely cut away or necked at 46 in order to insure independent resilient action of the upper or pin grip part when receiving a tube pin, and the lower or terminal part when being inserted in a printed board. After the soldering operation the lower part is no longer yieldable, but the upper part remains yieldable to accommodate changes of tube. In order to keep the contact stiff as a support column, despite the necking of the metal at the point 46, I provide a bead 72 which runs longitudinally along the back of the contact in the middle or necked region.

Figure 8:
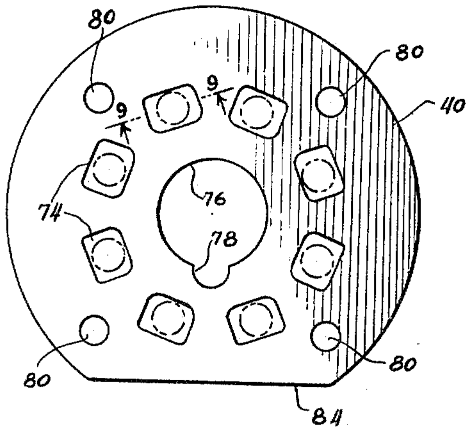
Fig. 8 is a plan view of the lower wafer.

Referring now to Fig. 8, the lower insulation wafer 40 has a ring of holes 74. These are preferably rectangular, or in any event non-circular, and of such configuration as to prevent rotation of the metal contacts when passed through the holes 74. However, the holes do not fit the contact tightly, for they preferably accommodate some expansion of the pin grip when a tube pin is pushed into place. Indeed the holes 74 are preferably made somewhat more oversize than would be needed for spreading of the pin grip, in order to additionally provide for some slight lateral shift or sideward self-adjustment of the location of the contacts to accommodate slight variations in location of the tube pins. However, as previously indicated, although the holes 74 may be oversized, they are shaped to prevent rotation of the contacts. The lamination 40 also has a large center hole 76 with a keyway 78 dimensioned to receive the keyed centering post of the "octal" type tube. There are also four small eyelet holes 80 the spacing of which from each of the contacts preferably is kept at least as great as the spacing between the contacts, thereby maintaining the insulating properties of the socket.

Referring now to Fig. 6 of the drawing, the upper wafer 38 has a keyed center hole 76' and four eyelet holes all of which register with those of the lower socket. It also has a ring of holes 82, in this case eight equally spaced holes dimensioned to receive the eight pins of an "octal" tube. These holes are, of course, in registration with the holes 74 of the lower wafer, so that the tube pins when inserted through the upper wafer will be guided into the pin grips of the contacts.

The conventional socket in this size has heretofore been made with diamond shaped wafers and eyelets at two corners, and eyelet holes at the intermediate two corners for mounting the socket on a chassis. In the present case the socket is mounted by means of the posts, and the wafers may be made circular in outline, as shown. However, they may be provided with a flat side, shown at 84 in Figs. 6 and 8, to help orient the socket. In the present case this flat side is conveniently disposed at the keyway 78, but other arrangements could be used.

Figure 10:
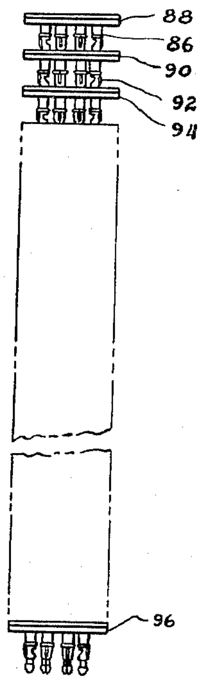
Fig. 10 shows a portion of a stack of sockets.

The present socket has an additional important feature in that it may be stacked, that is, a large number of sockets may be detachably connected to one another in superposed relation to form a stick of sockets, which may be stored and shipped and even used in that fashion. A piece of such a stick of sockets is illustrated in Fig. 10 of the drawing, referring to which the lower ends of the contacts 86 of socket 88 are received in holes formed in the top of a subjacent socket 90, and similarly the lower ends of the contacts 92 of socket 90 are received in the top of a next subjacent socket 94, and so on down to the bottom socket 96. The resulting sticks of sockets may be two or three feet long, and are quite stable or strong.

Figure 9:
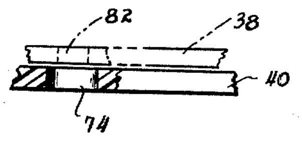
Fig. 9 is a fragmentary section taken approximately in the plane of the line 9—9 of Fig. 8.
Figure 11:
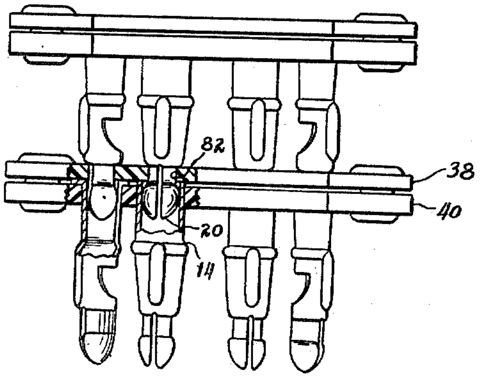
Fig. 11 is a partially sectioned elevation drawn to enlarged scale to show the method of stacking of the sockets.

The sockets are fitted together with a resilient fit, and preferably a snap action, and this is provided quite simply by taking advantage of the same snap action which later on is to take place between the socket and the printed circuit board. Referring to Fig. 9, the hole 82 in the top wafer 38 is much smaller than the hole 74 in the bottom wafer 40. This is in the direction of the line 9—9 in Fig. 8. Referring now to Fig. 11, the rounded or pointed bottom tip 20 is readily pushed through the hole 82 in the upper wafer, and the lower end of the post expands to hold itself with a tight grip in the upper wafer 38. Outward or spreading movement of the enlarged ends of the post are accommodated in the enlarged pin grip portion of the contact 14 of the lower socket. The pin grip is shaped and dimensioned as shown in Fig. 4 with this stacking operation in mind.

This clearance is provided along one diameter, and not the other or cross diameter, but it is only needed along one diameter. In Fig. 8 the upper holes are shown in broken lines. The difference in dimension between the upper and lower holes in radial direction is rather small, and corresponds substantially to the thickness of the metal of the contact. Accordingly, in a radial section at the left side of Fig. 11 the hole in upper wafer 38 aligns itself approximately with the interior of the contact, and little snap action would result. However, in a section taken circumferentially, as indicated at the line 9—9 in Fig. 8, which corresponds to Fig. 9, and also to the section through the second contact from the left in Fig. 11, there is a substantial difference in dimension, which effectively accommodates the desired snap action. It is in this direction that the slotted post has its spring action.

It will be understood that all of the pins are thus interengaged, providing a very strong and effective interlock between the superposed sockets of the stack.

The stacking of sockets as here described is important not only for storage and shipment, but also in adapting the sockets for mechanized insertion in accordance with the method, and using the machine, disclosed in my copending application Serial No. 579,664 previously mentioned.

It will be understood that for most effective stacking of the sockets the holes 70 (Fig. 7) in the printed board preferably conform in location to the holes in the top wafer. The holes in the printed circuit board are specified by the socket manufacturer, to the socket user. The lower ends of the terminal posts are designed for use in a ring of holes which is the same as the ring of holes formed in the top wafer of the socket.

It will be understood that while I have referred repeatedly to an octal socket for an octal tube, different numbers of contacts may be provided to accommodate any standard tube having a lesser or greater number of pins. For convenience the socket has been described as a tube socket, but it will be understood that the socket may be used to detachably receive any other component or male connector having similar pins.

It is believed that the construction, operation, and method of use of my improved socket, as well as the advantages thereof, will be apparent from the foregoing detailed description. It will be apparent also that while I have shown and described the invention in a preferred form, changes may be made in the structure shown, without departing from the scope of the invention, as sought to be defined in the following claims. In the claims the term "pointed" for the lower ends of the posts is not intended to exclude rounded and bullet nose or any other shape which facilitates insertion of the posts into mating holes.

I claim:

1. A socket for printed circuits, said socket comprising an insulation body made up of upper and lower wafers of sheet insulation, said body carrying metal contacts, each of said contacts being made of a single piece of sheet metal and comprising anchor lugs and a pin grip at its upper end and a support-and-terminal post at its lower end, said pin grip and post being disposed end to end, said lower wafer having non-circular holes, said pin grip being non-circular to prevent rotation of the contact, the anchor lugs of said contacts being held between the upper and lower wafers, means securing said upper and lower wafers together, said posts being hollow in cross-section for stiffness, the lower ends of the posts being pointed and longitudinally slotted so as to be resiliently compressible to be received with a resilient fit in holes in a printed circuit board.

2. A socket for printed circuits, said socket comprising an insulation body made up of upper and lower wafers of sheet insulation, said body carrying a ring of metal contacts, each of said contacts being made of a single piece of sheet metal and comprising anchor lugs and a slit sleeve-type pin grip at its upper end and a support-and-terminal post at its lower end, said contact having a cut-away portion or neck connecting said pin grip and post end to end, said lower wafer having a center hole and a concentric circle of non-circular holes, said pin grip being non-circular to prevent rotation of the contact, the anchor lugs of said contacts being held between the upper and lower wafers, eyelets securing said upper and lower wafers together, said upper wafer having a center hole and a concentric circle of holes for tube pins disposed in registration with the holes of the lower wafer, said posts being hollow in cross-section for stiffness, the lower ends of the posts being pointed and longitudinally slotted so as to be resiliently compressible and having a portion stepped to a reduced diameter to be received with a snap fit in a mating circle of holes in a printed circuit board.

3. A socket for printed circuits, said socket comprising an insulation body carrying metal contacts, each of said contacts being made of a single piece of sheet metal and comprising a pin grip and a socket support-and-terminal with a connection therebetween, the lower ends of said terminals being so shaped as to be received with a resilient fit in a printed circuit board, said pin grips being so shaped as to be resiliently yieldable independently of the terminals, and vice versa, the top of the socket having holes located in registry with the terminals, and the parts being so shaped and dimensioned that the lower ends of the terminals of one socket may be received in the upper part of a similar subjacent socket with a resilient fit in order to hold a series of sockets in stacked or superposed relation.

4. A socket for printed circuits, said socket comprising an insulation body carrying metal contacts, each of said contacts being made of a single piece of sheet metal and comprising a pin grip and a socket support-and-terminal post with a connection therebetween, said posts being hollow in cross-section for stiffness, the lower ends of said posts being pointed and longitudinally slotted so as to be resiliently compressible to be received with a resilient fit in mating holes in a printed circuit board, said pin grips being so shaped as to be resiliently yieldable independently of the terminals, and vice versa, the top of the socket having holes located in registry with the posts, and the parts being so shaped and dimensioned that the lower ends of the posts of one socket may be received in the upper part of a similar subjacent socket with a resilient fit in order to hold a series of sockets in stacked or superposed relation.

5. A socket for printed circuits, said socket comprising an insulation body made up of upper and lower wafers of sheet insulation, said body carrying metal contacts, each of said contacts being made of a single piece of sheet metal and comprising a pin grip and a support-and-terminal post with a connection therebetween, said contacts passing through the lower wafer and being held between the upper and lower wafers, means securing said wafers together, said posts being hollow in cross-section for stiffness, the lower ends of said posts being pointed and longitudinally slotted so as to be resiliently compressible to be received with a resilient fit in mating holes in a printed circuit board, the upper wafer having holes located in registry with the posts, and the parts being so shaped and dimensioned that the lower ends of the posts of one socket may be received in the upper part of a similar subjacent socket with a resilient fit in order to act as the sole means to hold a series of sockets in stacked or superposed relation.

6. A socket for printed circuits, said socket comprising an insulation body made up of upper and lower wafers of sheet insulation, said body carrying a ring of metal contacts, each of said contacts being made of a single piece of sheet metal and comprising a slit sleeve type pin grip and a support-and-terminal post with a connection therebetween, said contacts passing through the lower wafer and having parts held between the upper and lower wafers, eyelets securing said wafers together, said posts being hollow in cross-section for stiffness, the lower ends of said posts being pointed and longitudinally slotted so as to be resiliently compressible, and having a portion stepped to a reduced diameter to be received with a snap fit in mating holes in a printed circuit board, the upper wafer having a circle of holes located in registry with the posts, the pin grips being enlarged relative to the tube pin holes, and the parts being so shaped and dimensioned that the lower ends of the posts of one socket may be received in the holes of the upper wafer of a similar subjacent socket with a resilient snap fit in order to act as the sole means to hold a series of sockets in stacked or superposed relation.

7. A socket for printed circuits, said socket comprising an insulation body carrying metal contacts, each of said contacts being made of a single piece of sheet metal and comprising a pin grip at its upper end and a socket support-and-terminal at its lower end, said pin grip and said terminal being disposed end to end, the lower ends of the terminals being so shaped as to be received with a resilient fit in a printed circuit board, said pin grips being so shaped as to be resiliently yieldable independently of the terminals, and vice versa, the tube pin holes at the top of the socket with its metal contacts being so dimensioned and located as to additionally receive the lower ends of the terminals of a superjacent similar socket with a resilient fit in order to hold a series of sockets in stacked or superposed relation.

8. A socket for printed circuits, said socket comprising an insulation body carrying metal contacts, each of said contacts being made of a single piece of sheet metal and comprising a pin grip at its upper end and a socket support-and-terminal post at its lower end, said pin grip and said post being disposed end to end, said posts being hollow in cross-section for stiffness, the lower ends of the posts being pointed and longitudinally slotted so as to be resiliently compressible to be received with a resilient fit in mating holes in a printed circuit board, said pin grips being so shaped as to be resiliently yieldable independently of the terminals, and vice versa, the tube pin holes at the top of the socket with its metal contacts being so dimensioned and located as to receive the lower ends of the posts of a superjacent similar socket with a resilient fit in order to hold a series of sockets in stacked or superposed relation.

9. A socket for printed circuits, said socket comprising an insulation body made up of upper and lower wafers of sheet insulation, said body carrying metal contacts, each of said contacts being made of a single piece of sheet metal and comprising anchor lugs and a pin grip at its upper end and a support-and-terminal post at its lower end, said contact having a cut-away portion or neck connecting said pin grip and post end to end, said upper wafer having tube pin holes, said lower wafer having non-circular holes, said pin grip being non-circular, the anchor lugs of said contacts being held between the upper and lower wafers, means securing said upper and lower wafers together, said posts being hollow in cross-section for stiffness, the lower ends of the posts being pointed and longitudinally slotted so as to be resiliently compressible to be received with a resilient fit in mating holes in a printed circuit board which holes conform to the tube pin holes in the upper wafer, whereby the upper wafer receives the lower ends of the posts of a superjacent similar socket with a resilient fit in order to hold a series of sockets in stacked or superposed relation.

10. A socket for printed circuits, said socket comprising an insulation body made up of upper and lower wafers of sheet insulation, said body carrying a ring of metal contacts, each of said contacts being made of a single piece of sheet metal and comprising anchor lugs and a slit sleeve type pin grip at its upper end and a support-and-terminal post at its lower end, said contact having a cut-away portion or neck connecting said pin grip and post end to end, said lower wafer having a center hole and a concentric circle of non-circular holes, said pin grip being non-circular, the anchor lugs of said contacts being held between the upper and lower wafers, eyelets securing said upper and lower wafers together, said upper wafer having a center hole and a concentric circle of holes for tube pins disposed in registration with the holes of the lower wafer, said pin grips being enlarged relative to the tube pin holes, said posts being hollow in cross-section for stiffness, the lower ends of the posts being pointed and longitudinally slotted so as to be resiliently compressible and having a portion stepped to a reduced diameter to be received with a snap fit in a mating circle of holes in a printed circuit board which holes conform to the tube pin holes in the upper wafer, whereby the upper wafer receives the lower ends of the posts of a superjacent similar socket with a resilient fit in order to hold a series of sockets in stacked or superposed relation.

11. A socket for a printed circuit, said socket comprising an insulation body carrying metal contacts projecting downward from said body, each of said contacts being made of a single piece of sheet metal and comprising a pin grip of the sleeve type at its upper end, and a socket-support-and-terminal-post at its lower end, said pin grip and said post being disposed end-to-end, said post being hollow in cross section and being pointed at its lower end and longitudinally slotted to facilitate insertion in mating holes in a printed circuit board, said contact being partly cut away between the pin grip and the post to insure yieldability of the pin grip independently of the post.

12. A socket for a printed circuit, said socket comprising an insulation body carrying metal contacts projecting downward from said body, each of said contacts being made of a single piece of sheet metal and comprising a pin grip of the sleeve type at its upper end, and a socket-support-and-terminal-post at its lower end, said pin grip and said post being disposed end-to-end, said post being hollow in cross section and being pointed at its lower end and longitudinally slotted to facilitate insertion in mating holes in a printed circuit board, said contact being partly cut away between the pin grip and the post to insure yieldability of the pin grip independently of the post, the connecting portion at said cut away having a vertical stiffening bead.

13. A socket for a printed circuit, said socket comprising an insulation body carrying metal contacts projecting downward from said body, each of said contacts being made of a single piece of sheet metal and comprising a pin grip of the sleeve type at its upper end, and a socket-support-and-terminal-post at its lower end, said pin grip and said post being disposed end-to-end, said post being hollow in cross section and being pointed at its lower end and longitudinally slotted to facilitate insertion in mating holes in a printed circuit board, said post being enlarged at two points axially spaced apart an amount corresponding approximately to the thickness of the printed circuit board for retention of said socket, and to limit insertion in said board with the pin grips spaced above the board and with the posts passing somewhat beyond the board for pot soldering to printed circuitry, said contact being partly cut away between the pin grip and the post to insure yieldability of the pin grip independently of the post.

14. A socket for a printed circuit, said socket comprising an insulation body carrying metal contacts projecting downward from said body, each of said contacts being made of a single piece of sheet metal and comprising a pin grip of the sleeve type at its upper end, and a socket-support-and-terminal-post at its lower end, said pin grip and said post being disposed end-to-end, said post being shaped to facilitate insertion in mating holes in a printed circuit board, said contact being partly cut away between the pin grip and the post to insure yieldability of the pin grip independently of the post.

15. As an article of manufacture, a stack of superposed radio tube sockets detachably connected to one another in superposed relation, each of said sockets comprising an insulation body carrying metal contacts, each of said contacts being made of a single piece of sheet metal and comprising a pin grip and a support-and-terminal with a connection therebetween, the lower ends of said terminals being so shaped as to be received with a resilient fit in a printed circuit board, the top of the socket having holes located in registry with the terminals, the lower ends of the terminals of each socket being held in the holes of the top of the subjacent socket with a resilient fit.

16. As an article of manufacture, a stack of superposed radio tube sockets detachably connected to one another in superposed relation, each of said sockets comprising an insulation body carrying metal contacts, each of said contacts being made of a single piece of sheet metal and comprising a pin grip and a support-and-terminal post with a connection therebetween, said posts being hollow in cross-section for stiffness, the lower ends of said posts being pointed and longitudinally slotted so as to be resiliently compressible to be received with a resilient fit in mating holes in a printed circuit board, the top of the socket having holes located in registry with the posts, the lower ends of the posts of each socket being held in the holes of the top of the subjacent socket with a resilient fit.

17. As an article of manufacture, a stack of superposed radio tube sockets detachably connected to one another in superposed relation, each of said sockets comprising an insulation body made up of upper and lower wafers of sheet insulation, said body carrying metal contacts, each of said contacts being made of a single piece of sheet metal and comprising a pin grip and a support-and-terminal post with a connection therebetween, said contacts passing through the lower wafer and having parts held between the upper and lower wafers, means securing said wafers together, said posts being hollow in cross-section for stiffness, the lower ends of said posts being pointed and longitudinally slotted so as to be resiliently compressible to be received with a resilient fit in mating holes in a printed circuit board, the upper wafer having holes located in registry with the posts, the lower ends of the posts of each socket being held in the holes of the upper wafer of the subjacent socket with a resilient fit.

18. As an article of manufacture, a stack of superposed radio tube sockets detachably connected to one another in superposed relation, each of said sockets comprising an insulation body made up of upper and lower wafers of sheet insulation, said body carrying a ring of metal contacts, each of said contacts being made of a single piece of sheet metal and comprising a slit sleeve type pin grip and a support-and-terminal post with a connection therebetween, said contacts passing through the lower wafer and having parts held between the upper and lower wafers, eyelets securing said wafers together, said posts being hollow in cross-section for stiffness, the lower ends of said posts being pointed and longitudinally slotted so as to be resiliently compressible, and having a portion stepped to a reduced diameter to be received with a snap fit in mating holes in a printed circuit board, the upper wafer having a circle of holes located in registry with the posts, the lower ends of the posts of each socket being held in the holes of the upper wafer of the subjacent socket with a resilient snap fit.

19. As an article of manufacture, a stack of superposed radio tube sockets detachably connected to one another in superposed relation, each of said sockets comprising an insulation body carrying metal contacts, each of said contacts being made of a single piece of sheet metal and comprising a pin grip at its upper end and a support-and-terminal at its lower end, said pin grip and terminal being disposed end to end, the lower ends of the terminals being so shaped as to be received with a resilient fit in a printed circuit board, and the lower ends of the terminals of each socket being received in the tube pin holes at the top of the subjacent socket with a resilient fit.

20. As an article of manufacture, a stack of superposed radio tube sockets detachably connected to one another in superposed relation, each of said sockets comprising an insulation body carrying metal contacts, each of said contacts being made of a single piece of sheet metal and comprising a pin grip at its upper end and a support-and-terminal post at its lower end, said pin grip and post being disposed end to end, said posts being hollow in cross-section for stiffness, the lower ends of the posts being pointed and longitudinally slotted so as to be resiliently compressible to be received with a resilient fit in mating holes in a printed circuit board, and the lower ends of the posts of each socket being received in the tube pin holes at the top of the subjacent socket with a resilient fit.

21. As an article of manufacture, a stack of superposed radio tube sockets detachably connected to one another in superposed relation, each of said sockets comprising an insulation body made up of upper and lower wafers of sheet insulation, said body carrying metal contacts, each of said contacts being made of a single piece of sheet metal and comprising anchor lugs and a pin grip at its upper end and a support-and-terminal post at its lower end, said contact having a cut-way portion or neck connecting said pin grip and post end to end, said upper wafer having tube pin holes, said lower wafer having non-circular holes, said pin grip being non-circular and enlarged relative to the tube pin holes, the anchor lugs of said contacts being held between the upper and lower wafers, means securing said upper and lower wafers together, said posts being hollow in cross-section for stiffness, the lower ends of the posts being pointed and longitudinally slotted so as to be resiliently compressible to be received with a resilient fit in mating holes in a printed circuit board, and the lower ends of the posts of each socket being received in the tube pin holes in the upper wafer of the subjacent socket with a resilient fit.

22. As an article of manufacture, a stack of superposed radio tube sockets detachably connected to one another in superposed relation, each of said sockets comprising an insulation body made up of upper and lower wafers of sheet insulation, said body carrying a ring of metal contacts, each of said contacts being made of a single piece of sheet metal and comprising anchor lugs and a slit sleeve type pin grip at its upper end and a support-and-terminal post at its lower end, said contact having a cut-away portion or neck connecting said pin grip and post end to end, said lower wafer having a center hole and a concentric circle of non-circular holes, said pin grip being non-circular, the anchor lugs of said contacts being held between the upper and lower wafers, eyelets securing said upper and lower wafers together, said upper wafer having a center hole and a concentric circle of holes for tube pins disposed in registration with the holes of the lower wafer, said pin grips being enlarged relative to the tube pin holes, said posts being hollow in cross-section for stiffness, the lower ends of the posts being pointed and longitudinally slotted so as to be resiliently compressible and having a portion stepped to a reduced diameter to be received with a snap fit in a mating circle of holes in a printed circuit board, and the lower ends of the posts of each socket being received in the tube pin holes in the upper wafer of the subjacent socket with a resilient snap fit.

References Cited in the file of this patent

UNITED STATES PATENTS

| | | |
|---|---|---|
| 2,215,366 | Alden | Sept. 17, 1940 |
| 2,319,728 | Eby | May 18, 1943 |
| 2,517,677 | Berger | Aug. 8, 1950 |
| 2,814,024 | Narozny | Nov. 19, 1957 |

FOREIGN PATENTS

| | | |
|---|---|---|
| 414,488 | Italy | Aug. 7, 1946 |